United States Patent [19]

Bodnar

[11] Patent Number: 4,711,426
[45] Date of Patent: Dec. 8, 1987

[54] FLANGED VALVE CONNECTORS

[76] Inventor: Thomas R. Bodnar, 3378 MacIntyre Dr., Murrysville, Pa. 15668

[21] Appl. No.: 922,007

[22] Filed: Oct. 22, 1986

Related U.S. Application Data

[63] Continuation-in-part of Ser. No. 734,782, May 16, 1985, abandoned.

[51] Int. Cl.[4] .............................................. F16K 51/00
[52] U.S. Cl. .................................... 251/151; 285/323; 285/348; 285/368
[58] Field of Search ................ 251/148, 151; 285/322, 285/323, 348, 368, 286

[56] References Cited

U.S. PATENT DOCUMENTS

| 1,979,141 | 10/1934 | Clark et al. | 285/348 |
| 2,832,615 | 4/1958 | Summers | 285/342 |
| 3,194,592 | 7/1965 | Boughton | 285/342 |

FOREIGN PATENT DOCUMENTS

| 556924 | 5/1958 | Canada | 251/327 |
| 2552104 | 1/1977 | Fed. Rep. of Germany | 285/323 |

Primary Examiner—A. Michael Chambers
Attorney, Agent, or Firm—Paul Bogdon

[57] ABSTRACT

A combination valve and flanged connector for connecting a metallic or non-metallic pipe directly to the valve body is disclosed. The flanged valve connector includes a radial flange secured on a longitudinal end of the valve body. Secured to the radial flange is a tubular member for receiving the end section of a pipe to be connected with the valve body. The tubular member has a generally frusto conical end sized to snugly receive a sealing gasket in sealed relationship between the tubular member and the valve body. The tubular member also has a length sufficient to be engaged by a retainer for holding the sealed gasket in place and to also support a follower ring engaging the gasket retainer, the follower ring being provided with a deep, longitudinally extending strengthening flange.

4 Claims, 3 Drawing Figures

FLANGED VALVE CONNECTORS

RELATIONSHIP TO OTHER PATENT APPLICATIONS

This patent application is a continuation-in-part of U.S. patent application Ser. No. 734,782, filed May 16, 1985, now abandoned in the name of THOMAS R. BODNAR for Flanged Valve Connectors.

BACKGROUND OF THE INVENTION

This invention relates to the combination of a valve and a connector for that valve, referred to as a flanged valve connector, for connecting metallic or non-metallic pipe directly to the valve body.

In the pipeline industry there has been a significant renewal of pipe particularly in gas transmission and distribution pipeline systems. In distribution systems cast iron and steel pipe is being replaced by plastic pipe. This replacement poses problems both in the tie-in connection of the plastic pipe to the metallic pipe as well as in the installation of valves in the renewed pipeline. Where plastic pipe is connected to metallic pipe the connection may be with a mechanical bolt type coupling or with a special steel-to-plastic pipe transition fitting which is welded directly to both the steel and plastic piping.

If a steel valve was necessary at the tie-in connection or elsewhere in a plastic pipeline, it was necessary prior to this invention, to use a stub end valve and to first extend the stub end by welding a short length of steel pipe, or what is known as a "pup", to each end. This was done in order for the valve ends to accept the installation of mechanical bolt-on type couplings. The valve was then installed into the pipeline by connecting one extended stub end to the metallic pipe with a metallic bolt-on type coupling and connecting the opposite extended stub end to the plastic pipeline with a mechanical bolt-on type coupling. An alternative valve installation used when steel pipe and plastic pipe were involved, is to use a stub end valve and to weld one stub end directly to the steel pipeline and to weld the special steel-to-plastic transition fitting to the opposite valve stub end and then to weld the fitting to the plastic pipeline. So far as is known, there has not been provided a valve structure which would solve this problem of connecting pipelines of dissimilar or incompatible material and also act to provide valving for the line.

My invention overcomes the aforementioned problems by providing a valve and connector structure which may be attached to the free end of a plastic pipeline or a metallic pipleine to both seal and hold the plastic or metallic pipe to the valve body, and also to allow the other side of the valve to be welded to a metallic pipeline in the usual fashion.

SUMMARY OF THE INVENTION

My invention in its preferred form is a combination with a valve including a valve body having a longitudinal passageway therethrough, a closure element for the valve body intermediate its ends, operator means acting on the closure element to open and close the longitudinal passageway, a flanged valve connector comprising: a radial flange on the valve body on at least one of the longitudinal ends thereof for securing a coupling assembly to the valve body; a tubular member secured to the radial flange and coaxial with the longitudinal passageway for receiving the end of a pipe to be connected with the valve body; the tubular member having a generally frusto conical end opening outwardly and sized to snugly receive a sealing gasket in sealed relationship between the tubular member and a pipe to be connected with the valve body; and the tubular member having a length sufficient to be engaged by a generally cylindrically shaped gasket retainer having a flanged section for snugly engaging the sealing gasket arranged in union with the frusto conical end opening and to support a follower ring engaging the gasket retainer having a deep flange, the follower ring functioning to secure the gasket retainer and gasket to the tubular member. The follower ring to be used on the tubular member forming part of my invention, is provided with a deep flange, as is well known to those skilled in this particular art, the deep flange serving to provide the necessary strength characteristics to the follower to allow it to be used to secure the gasket retainer and gasket to the tubular member. My invention is thus in the nature of a valve end socket permitting a bolted compression fitting to be secured to the valve body which fitting in turn secures either a metallic or non-metallic pipeline to the valve. By providing my socket with a valve, the cost of welding a stub section and "pup" to the valve is eliminated. Also, my invention eliminates the need for the middle and one end section of a complete mechanical bolt on type coupling. Eliminating the stub type end section and the middle and end section of the complete coupling results in a significant cost saving in connecting pipelines to my valve.

My valve and connector combination may also be extended to include the elements of the connector for securing the pipeline to the valve body. My invention could include an annular elastomeric gasket adapted to be slideably and snugly fit over the end of the pipe to be secured to the valve body with the gasket having a generally frusto connical end portion adapted to fit into the mating frusto conical opening of my tubular member. The combination could also include a gasket retainer having a sleeve member with an annular section and a cylindrical section extending over the gasket and containing the gasket against radial and axial expansion; a follower ring bearing on the gasket and the cylindrical section of the sleeve member to force the sleeve member and the gasket to engagement with the tubular member; primary tightening means between the follower ring and radial flange acting on the follower ring to move it axially toward the valve body to force the gasket into sealing engagement with the tubular member and pipe end; a back up ring axially spaced from the follower ring having a frusto conical opening surrounding the pipe; a compressible frusto conical jaw means in the opening in the back up ring surrounding and engaging the pipe end; surface engaging means on the jaw means engaging the pipe against axial movement; and secondary tightening means between the radial flange, the follower ring, and the back up ring drawing the back up ring axially toward the follower ring and compressing the jaw means radially inwardly into engagement with the pipe. The primary tightening means may be in the form of a bolt or bolts extending through holes in the flange and follower ring with tightening nuts bearing on the follower ring. The secondary tightening means may be an extension of the bolt beyond the follower ring to pass through holes in the back up ring and receive nuts bearing on the back up ring. The frusto conical jaw means may be a single split ring as in German Patent No. 19447826, a plurality of spaced jaw members or a multiple split ring as in U.S. Pat. No. 4,070,046. The sealing gasket may be of rubber, neoprene, or any other suitable elastomeric material capable of creating a seal under pressure.

Various other advantages, details, and modifications of the present invention will become apparent as the following description of a preferred embodiment proceeds.

DESCRIPTION OF THE DRAWINGS

In the accompanying drawings I show certain preferred embodiments of this invention in which:

FIG. 3 is another embodiment of this invention showing both ends of a valve body with connectors for connecting pipe to the valve body.

DETAILED DESCRIPTION OF THE PREFERRED EMBODIMENTS

Figure 1:
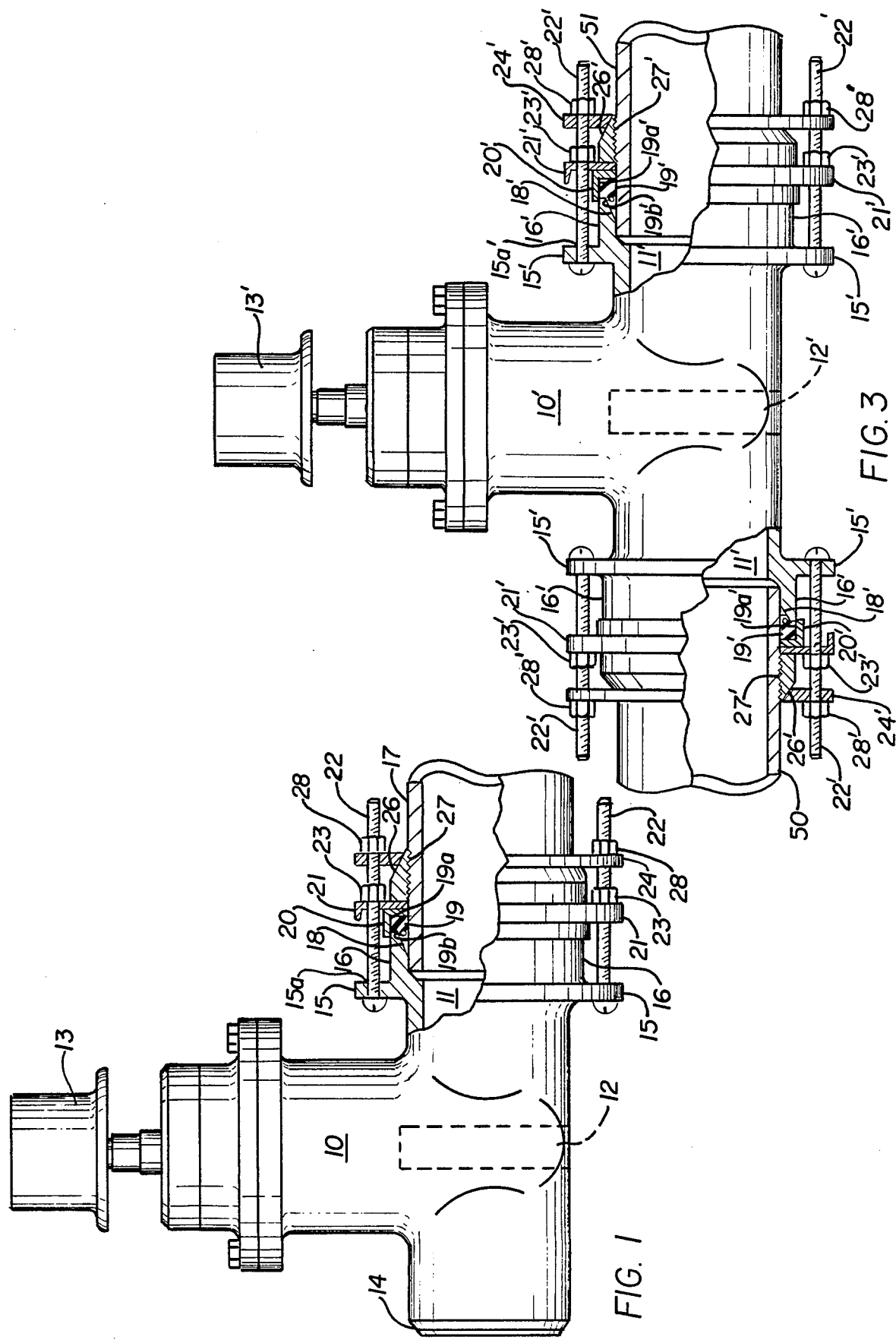
FIG. 1 is a side elevation view of a flange valve connector embodying this invention showing a valve with the connector elements, partly in section for connecting pipe to the valve body.
Figure 2:
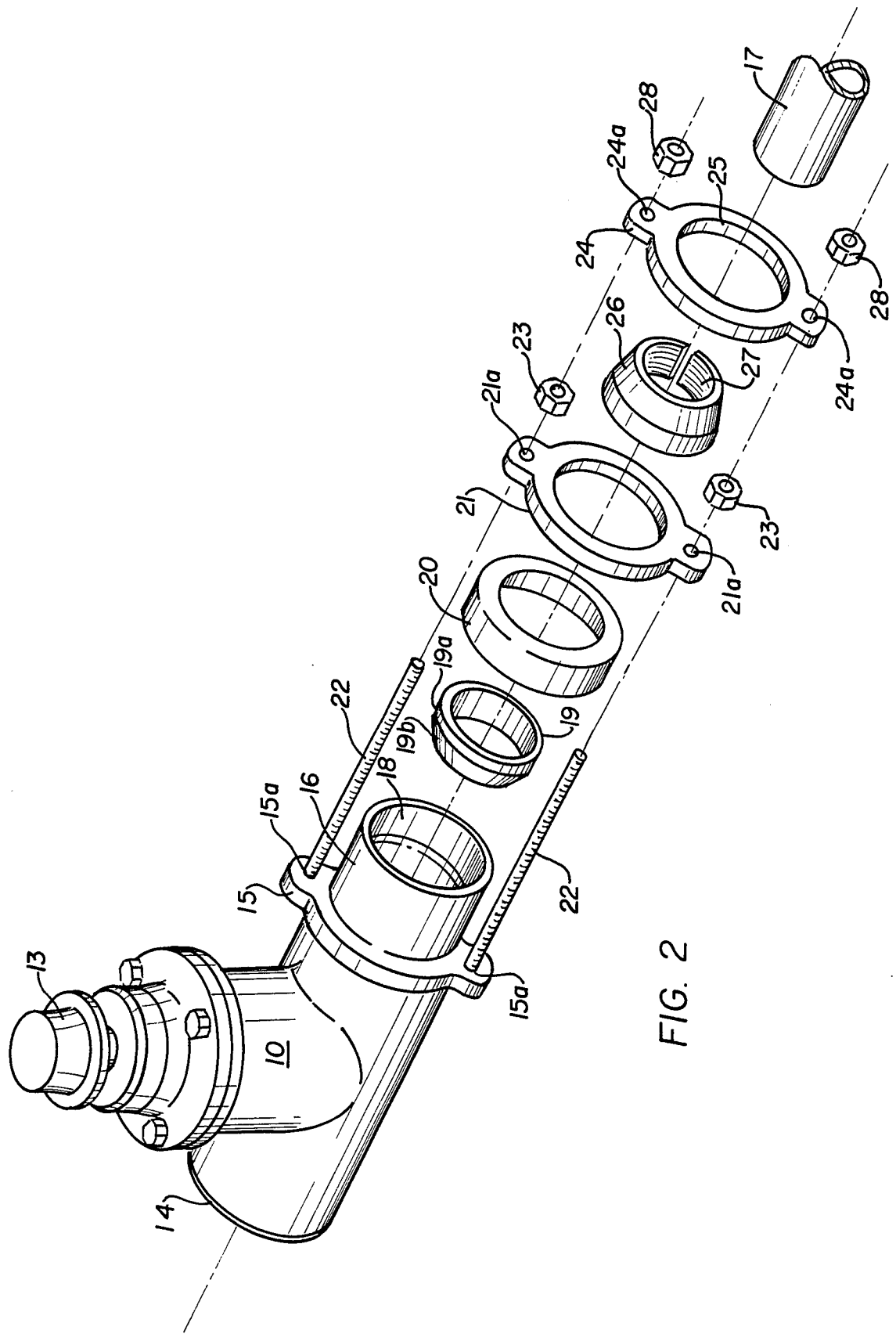
FIG. 2 is a perspective view, partly exploded, with the elements of the valve of FIG. 1 shown separated from their interconnection.

Referring to the drawings and particularly to FIGS. 1 and 2, I have illustrated a valve structure according to my invention having a valve body 10, with a longitudinal passage 11 therethrough, a closure element 12 in the valve body intermediate its ends and an operator means 13 acting on the closure element to open and close passage 11. One end of body 10 is provided with a bevel 14 for welding to the end of a metallic pipe in the usual manner. The other end of valve body 10 is provided with the connector of my invention or as I also referred to it, my valve end socket, which permits a bolted compression fitting to be secured to the valve body 10. The valve connector of my invention is provided with a radial outwardly extending flange 15 with an enlarged cylindrical or tubular sleeve 16 coaxial with passage 11 and adapted to receive the end 17 of a pipe to be connected to the valve body. Sleeve 16 has, at its open end, a flared or frusto conical opening 18 for receiving an elastomeric sealing gasket 19 having a short cylindrical portion 19a and a frusto conical end portion 19b adapted to fit into the flared opening 18. The sealing gasket 19 is adapted to fit snugly and slideably around pipe end 17. A generally cylindrically shaped sleeve 20 or what is often referred to as a gasket retainer, surrounds gasket 19 and the end periphery of sleeve 16. A follower ring 21 is snugly and slideably received over pipe end 17 to abut the radial section of cylindrical sleeve 20. The axial section of cylindrical sleeve 20 abuts the axial section of gasket 19 while the radial section of the sleeve will abut the radail section of the gasket. Cylindrical sleeve 20 therefore serves to secure gasket 19 within sleeve 16. The follower ring 21 in turn abuts the radial section of cylindrical sleeve 20 to urge it into securing relationship with the gasket 19. Bolts 22 extend through holes 15a in flange 15 and holes 21a in follower ring 21, and receive tightening nuts 23 for drawing follower ring 21 axially toward valve body 10 to force the gasket into the frusto conical opening of sleeve 16 and into tight sealing engagement with both sleeve 16 and pipe 17. As is clearly shown in FIG. 1, the follower ring 21 includes an axially extending annular flange of measureable dimension. The flange is referred to as a "deep flange" and is provided to strengthen the follower ring. Those skilled in this art are aware of the deep flange found on follower rings and well recognize that it is necessary that follower ring 21 have such an annular flange so that it can withstand the torque force applied to the follower ring when tightening the nuts 23 on bolts 22 to transmit a force on the follower ring 21 sufficient to urge the cylindrical sleeve 20 against gasket 19 so as to provide the sealing engagment between the gasket 19 and the sleeve 16 and pipe 17. It is necessary that sleeve 16 have an axial length sufficient to receive the cylindrical sleeve 20 as well as to accommodate the annular flange of follower ring 21. Those skilled in this art will be well aware of the necessary length to be provided to sleeve 16 for the purposes just detailed.

Spaced from follower ring 21 is a back up ring 24 with a frusto conical opening 25 receiving split jaw 26. The split jaw 26 or its equivalent may be a split ring or separately connected jaws as disclosed in the German or United States Patents referred to in the introductory portion of this Specification. The jaw 26 has toothed grooves 27 adapted to engage the surface of the pipe end 17 to prevent its withdrawal from sleeve 16. The bolts 22 extend through openings 24a in the back up ring and nuts 28 draw back up ring 24 axially toward follower ring 21 with opening 25 compressing the jaw 26 tightly into engagement with pipe 17 so that the toothed grooves 27 are forced into the surface of the pipe 17 to prevent its removal from sleeve 16. The combination of bolts 22 and tightening nuts 23 acting in concert with flange 15 to draw the follower ring 21 toward valve body 10, serve as a primary tightening means between the follower ring and the flange 15. The nuts 28 coupled with bolt 22 serve as an auxiliary or secondary tightening means between flange 15, follower 21, and back up ring 24 to draw the back up ring 24 axially towards the follower ring 21 and at the same time compressing the jaw 26 radially inwardly into engagement with the pipe 17.

In FIG. 3, there is shown a second embodiment of the present invention which may be used to connect and valve lines 50 and 51 such as two plastic or metallic pipe ends in which those parts which are identical to parts in FIGS. 1 and 2 carry like numbers with a prime sign. In the embodiment of FIG. 3, both ends of the valve body are provided with radially outwardly extending flanges 15' and enlarged sleeve 16' coaxial with passage 11' and adapted to receive the ends 50 and 51 of the pipes to be connected to the valve. Each sleeve 16' has at its open end a flared or frusto conical opening 18' receiving an elastomeric gasket 19' having a short cylindrical portion 19a' in a frusto conical end portion 19b' adapted to fit in flared end portion 18'. The elastomeric gaskets 19' are adapted to fit snugly and slideably around pipe ends 50 and 51. A cylindrical sleeve 20' surrounds gasket 19' and the end periphery of gasket 16' with follower ring 21', is snugly slideably received over pipe 50 and 51 to abut the transverse base of gasket 19'. Bolts 22, extend through hole 15a' in flange 15' and holes 21a' and follower ring 21' and receiving tightening nuts 23' for drawing follower ring 21' axially toward valve body 10' to force gasket 19' into frusto conical opening 18' of sleeve 16' prime and thus into tight sealing engagement with both the opening 18' and pipe ends 50 and 51 as the case may be. Bolts 22' and tightening nuts 23' serve as the primary tightening means for gasket 19'. Spaced from follower ring 21' is a back up ring 24' with a frusto conical opening 25' receiving split jaw 26' as in FIGS. 1 and 2. As in the embodiment of FIGS. 1 and 2, bolts 22' extend through openings 21a; in the back up ring and nuts 28' draw back up ring 24' axially toward follower ring 21' with opening 25' compressing jaw means 26' into tight engagement with pipe ends 50 and 51 so that the toothed grooves 27' are forced into the surfaces of the pipe ends 50 and 51 to prevent their removal from sleeve 16'. Nuts 28' acting with bolts 22' serve as a secondary tightening means for the gasket 19' as well as for tightening the jaws 26' around pipe ends 50 and 51.

It should now be clearly understood how the flange valve connector of this invention provides the advantage of a simple and inexpensive manner of connecting pipelines to the valve body forming part of my invention. My flange valve connector eliminates the need of welding additional elements to the valve body and reduces the number of parts for connecting pipe to the valve body. Also, it should be readily apparent to those skilled in this art that the socket construction of my connector in its simplicity may be modified in structure to accommodate other particular type connector features without deviating from the scope of the invention.

While I have shown and described certain present preferred embodiments of this invention, it is to be distinctly understood that the invention is not limited thereto, but may be otherwise embodied and formed within the scope of the following claims.

I claim:

1. In combination with a valve including a valve body having a longitudinal passageway therethrough, a closure element for said valve body intermediate its ends, operator means acting on said closure element to open and close the longitudinal passageway, a flanged valve connector comprising:

radial flange means on said valve body on at least one of the longitudinal ends thereof for securing a bolt on compression coupling assembly to said valve body;

an enlarged tubular member secured to said radial flange means and extending outwardly from said radial flange means and coaxial with said longitudinal passageway for receiving the end of pipe to be connected with said valve body;

said tubular member having a generally frusto conical end opening outwardly and sized to snugly receive a sealing gasket in sealed relationship between said tubular member and a pipe to be connected with said valve body; and said tubular member having an axial length sufficient to be engaged by a gasket retainer having a cylindrical section sized to surround said sealing gasket and the end periphery of said tubular member and a radial section for snugly engaging said sealing gasket arranged in union with said frusto conical end opening and to receive a follower ring having a deep longitudinal flange extending over the periperal length of said tubular member and engaging said gasket retainer, the follower ring functioning to secure the gasket retainer and gasket to said tubular member.

2. In the combination as set forth in claim 1, wherein said sealing gasket is adapted to be slideably and snugly fit over the end of said pipe and having a generally frusto conical end portion adapted to fit into the frusto conical opening of said tubular member; wherein said gasket retainer has a sleeve member with an annular section and a cylindrical section extending over said gasket and containing said gasket against radial and axial expansion; said follower ring bearing on said gasket retainer and the annular section of said sleeve member to force said sleeve member and said gasket into engagement with said tubular member; primary tightening means between the follower ring and radial flange means acting on said follower ring to move it axially toward the valve body to force said gasket into sealing engagement with said tubular member and pipe end; a back up ring axially spaced from said follower ring having a frusto conical opening surrounding said pipe; a compressible frusto conical jaw means in said opening in the back up ring surrounding and engaging the pipe end; surface engaging means on said jaw means engaging said pipe against axial movement; and secondary tightening means between said radial flange means, said follower ring, said back up ring drawing said back up ring axially towards said follower ring and compressing said jaw means radially inwardly to engagement with the pipe.

3. In the combination as set forth in claim 2 wherein the primary tightening means is a threaded bolt extending through holes in said radial flange means, the follower ring, and the back up ring, with nuts engaging the follower ring to move it axially toward the valve body; and said secondary tightening means includes auxiliary nuts on said threaded bolt engaging the back up ring moving it toward the valve body and the follower.

4. In the combination as set forth in claim 2, wherein each end of the valve is provided with a radial flange means on said valve body adjacent each end; a tubular member secured to each radial flange means and coaxial with the longitudinal passageway for receiving the end of a pipe to be connected with said valve body; said tubular member having a generally frusto conical end opening outwardly; said sealing gasket adapted to slideably and snugly fit over the end of said pipe and having a generally frusto conical end portion adapted to fit into the frusto conical opening of said tubular member; said gasket retainer including a sleeve member having an annular section and a cylindrical section extending over said gasket and containing said gasket against radial and axial expansion; said follower ring bearing on said gasket retainer and the cylindrical section of the said sleeve member to force said gasket into said tubular member; primary tightening means between the follower ring and said flange means acting on the follower ring to move it axially toward the valve body to force said gasket into sealing engagement with the tubular member and pipe end; a back up ring axially spaced from said follower ring having a frusto conical opening surrounding said pipe; a compressible frusto conical jaw means in said opening in the back up ring surrounding and engaging the pipe end surface engaging means on said jaw means engaging said pipe against axial movement; and secondary tightening means between said radial flange means, the follower ring, and the back up ring drawing the back up ring axially toward the follower ring and compressing the jaw means radially inwardly into engagement with the pipe.

* * * * *